(No Model.) 3 Sheets—Sheet 1.
R. STUCKWISCH.
COMBINED HARROW AND CULTIVATOR.
No. 365,762. Patented June 28, 1887.
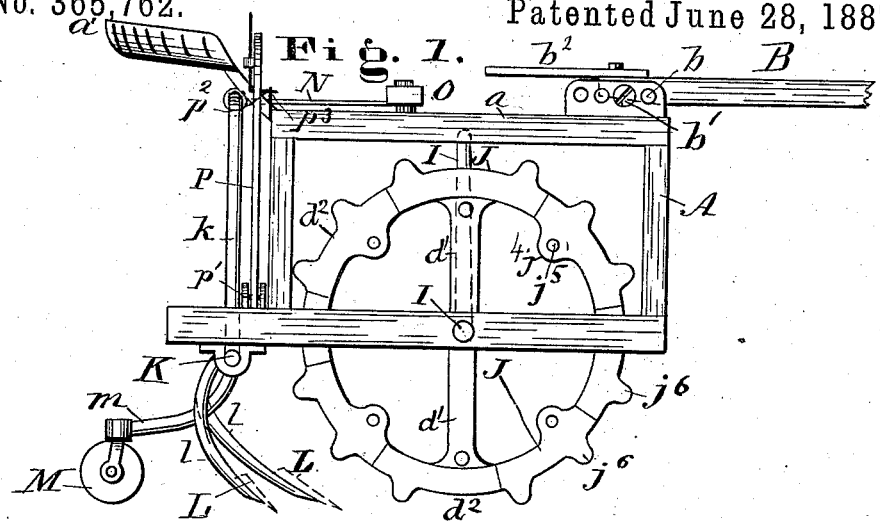
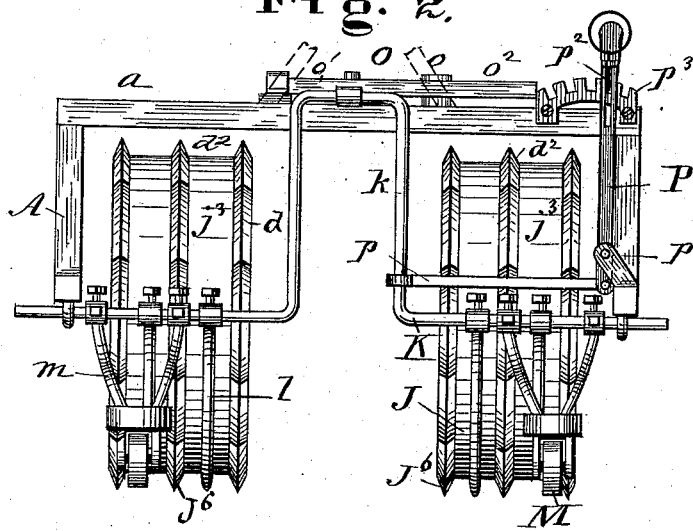
WITNESSES
A. L. Dowell
T. T. Johnson
INVENTOR
Rudolph Stuckwisch
by J. A. Alexander
Attorney (No Model.) 3 Sheets—Sheet 2.
R. STUCKWISCH.
COMBINED HARROW AND CULTIVATOR.
No. 365,762. Patented June 28, 1887.
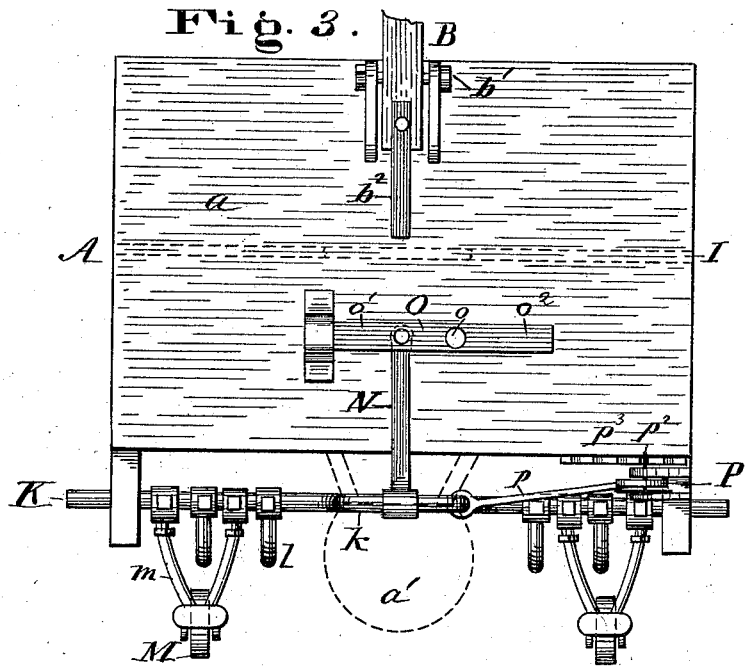
WITNESSES
INVENTOR (No Model.) 3 Sheets—Sheet 3.
R. STUCKWISCH.
COMBINED HARROW AND CULTIVATOR.
No. 365,762. Patented June 28, 1887.
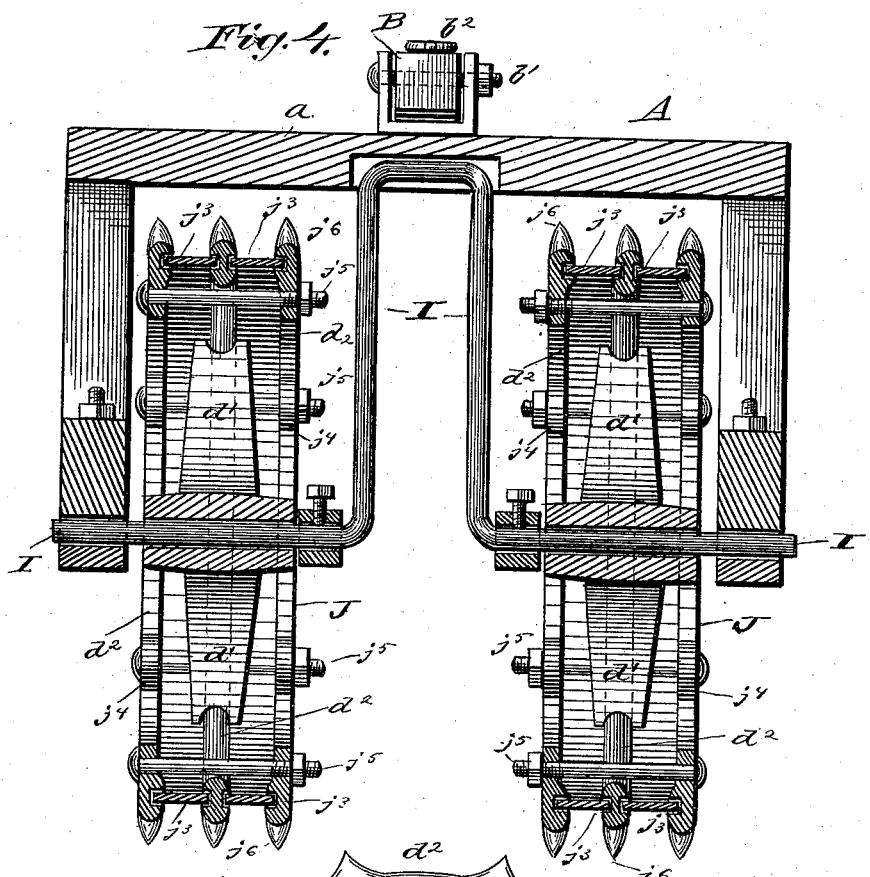
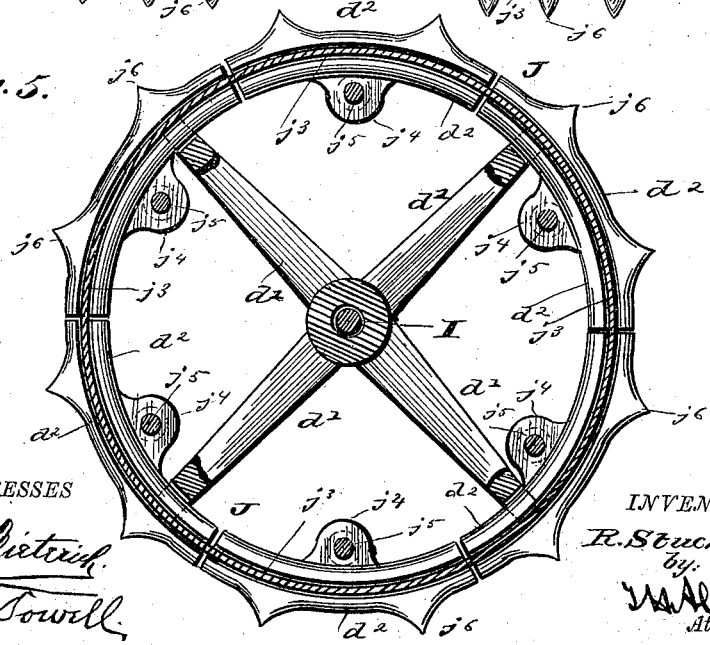
WITNESSES
Phil C. Dietrich
A. E. Dowell
INVENTOR
R. Stuckwisch
by
J. A. Alexander
Attorney

UNITED STATES PATENT OFFICE.

RUDOLPH STUCKWISCH, OF CORY, INDIANA.

COMBINED HARROW AND CULTIVATOR.

SPECIFICATION forming part of Letters Patent No. 365,762, dated June 28, 1887.

Application filed December 11, 1886. Serial No. 221,290. (No model.)

*To all whom it may concern:*

Be it known that I, RUDOLPH STUCKWISCH, of Cory, in the county of Clay and State of Indiana, have invented certain new and useful Improvements in Combined Harrow and Cultivator; and I do hereby declare that the following is a full, clear, and exact description thereof, reference being had to the accompanying drawings, and to the letters of reference marked thereon, which form part of this specification, in which—

Figure 1 is a side view of my improved combined harrow and cultivator. Fig. 2 is a rear view of the same with the harrow-wheel shaft removed. Fig. 3 is a plan view. Fig. 4 is a central vertical section, enlarged, through the machine on the line of the main shaft. Fig. 5 is a sectional detail view of one of the harrow-wheels.

This invention relates to improvements in combined harrows and cultivators; and it consists in the construction and novel arrangement of parts, hereinafter described, illustrated in the accompanying drawings, and pointed out in the claims hereto appended.

Referring to the accompanying drawings, A designates the main frame of the machine, having the top platform, $a$, at the rear end of which is secured the standard for the driver's seat $a'$.

B is the tongue, having its rear end or heel pivoted between the vertical leaves of a bracket secured upon platform $a$, near its front end, in a central position. The said bracket is provided in its leaves with a series of openings, $b$, by means of which and a bolt, $b'$, the tongue can be shifted farther outward or inward.

$b^2$ is a pedal extending inward from the heel of the tongue, so that the driver by pressing down thereon with his foot can elevate the front end of the tongue, the same turning on its pivot $b'$.

The frame A is open at front and rear, but has depending sides, upon the lower edge of which are the bearings for the harrow and cultivator shafts I K, hereinafter referred to.

J designates the harrow-wheels placed on shaft I, and which are made preferably of metal, each having a central hub moving easily on the shaft, and having preferably four equidistant spokes, $d'$, radiating therefrom, which spokes are cast with or have secured to their outer ends the sections $d^2$ of the fellies, which sections are of equal length. Each wheel is provided with three rows of fellies $d^2$, separated from each other by interposed metal rims or bands $j^3$, the central line of fellies being properly grooved on both sides for the reception of the inner edges of rims $j^3$, and the outer lines of fellies being similarly grooved for the reception of the outer edges of the rims. The rims $j^3$ run between the lines of fellies, as shown, and the sections of fellies are provided with perforated bosses or projections $j^4$ on their inner edges, through which bolts $j^5$ are passed, the projections on the several lines of fellies being made to correspond, and by proper nuts on the bolts the several parts of the harrow-wheel are firmly bound together.

The wheels J are provided on the outer edges of their fellies with a pulverizing-point, $j^6$, and the wheels are preferably mounted on a shaft, I, situated centrally of frame A, and having an upright bend or crank at its center under platform $a$, as shown. The top of this bend enters a recess in the under surface of platform $a$. By this construction the shaft I is prevented from rotating with wheels J, and keeps them the proper distance apart for cultivating or harrowing the ground between rows of plants, which can pass beneath the frame A, through bend in shaft I, between wheels J, uninjured. When harrowing in open ground, the shaft I may be replaced by a straight shaft and more harrow-wheels employed.

K designates a shaft similar to shaft I, and journaled in brackets secured to the rear extended portions of the sides of the frame A, as shown. Upon the shaft K, on each side of its bend or crank $k$, are secured the curved standards $l$ of cultivating-points or shovels L, the said standards being preferably convexed rearward, and having their enlarged upper ends secured on the shaft by set-screws, as shown.

M M are small following-wheels in rear of the shovels, journaled in the bifurcated lower ends of the standards $m$ $m$, secured at their upper ends upon the shaft K, similar to the standards of the shovels or cultivating-points.

N is a connecting-bar pivoted or properly jointed at its rear end upon the horizontal part of the bend $k$ of the shaft K, and at its front end pivoted upon one arm of the lever O a suitable distance from the pivot of said lever. The said lever is pivoted about centrally at $o$ upon the upper surface of the platform of the main frame, and has the arms $o'$ $o^2$ respectively on each side of its pivot. The driver, by pressing the arm $o'$, to which the bar N is pivoted, forward with his foot, turns the shaft K and shovels rearward and makes them enter the soil deeper. By pressing similarly on the arm $o^2$ he moves the shaft K and shovels forward, and causes them to enter the soil less deeply. The shaft K can move laterally in its bearings, so as to put the shovels or cultivating-points in different positions with relation to the wheels J. This is effected by the following means: $p$ is a connecting-rod, jointed at its inner end to one arm of the bend $k$ of the shaft K, and at its outer end to the lower end of the pivoted lever P, which lever is pivoted at $p'$ a suitable distance above its lower end to a bracket secured to one side of the main frame. The upper end of the lever P has secured to it a detent-point, $p^2$, which is adapted to engage between the teeth of the curved rack $p^3$, secured to the main frame, as shown, so that the shaft K and attached cultivator-standards can be retained at the point to which it has been shifted.

Having described my invention, what I claim is—

1. In a combined harrow and cultivator, the combination, with the main frame, shaft I, and wheels J, constructed substantially as described, of the shaft K, shovels or cultivator-points L, and standards $l$, secured to the said shaft, substantially as specified.

2. In a combined harrow and cultivator, the combination, with the main frame, the shaft I, and wheels J, constructed substantially as described, of the shaft K, having the bend or crank $k$, the shovels or cultivator-points L, the sustaining-wheels M, the connecting bar N, and pivoted lever O, substantially as specified.

3. In a combined harrow and cultivator, the combination of the main frame, the shaft I, and wheels J, constructed substantially as described, with the laterally-moving shaft K, having the bend $k$, the connecting-bar $p$, the lever P, the detent-point $p^2$, and rack $p^3$, all constructed and arranged to operate substantially as and for the purpose described.

4. The harrow or cultivator wheels J, composed of a metal hub, equidistant arms radiating therefrom, and having at their outer ends the sections of fellies $d^2$ of the inner or central line of fellies, the two outer lines of fellies separated from the inner line by metal bands or rims $j^3$, suitable perforated bosses on the inner edge of the felly-sections, by which the parts are rigidly united by means of suitable bolts and nuts, and suitable pulverizing teeth or projections on the outer edge of the felly-sections, all substantially as specified.

5. The combination, with the frame A, having depending sides and top $a$, and a tongue, B, pivoted between the leaves of a bracket provided with suitable adjusting-openings for the pivot, and secured on the top $a$, and provided with an adjusting-pedal, $b^2$, as described, of the wheels J, mounted on a suitable shaft journaled in the sides of the main frame, and composed of the metal hub, spokes $d'$, the three lines of felly-sections $d^2$, and interposed metal rims $j^3$ between the lines of fellies, and suitable means for rigidly uniting the parts of the wheels, all constructed and adapted to operate substantially as and for the purpose specified.

In testimony that I claim the foregoing as my own I affix my signature in presence of two witnesses.

R. STUCKWISCH.

Witnesses:
 JAMES H. MILES,
 T. P. HARTLEY.